July 10, 1956 W. E. LE CLAIR 2,753,754
PHOTOMETRIC APPARATUS

Filed Nov 2, 1951 2 Sheets-Sheet 1

INVENTOR.
Willis E. Le Clair
BY Eric E. Franke

July 10, 1956  W. E. LE CLAIR  2,753,754
PHOTOMETRIC APPARATUS

Filed Nov 2, 1951  2 Sheets-Sheet 2

INVENTOR.
Willis E. LeClair
BY Eric E. Franke

United States Patent Office 2,753,754
Patented July 10, 1956

2,753,754

PHOTOMETRIC APPARATUS

Willis E. Le Clair, Peekskill, N. Y., assignor to Interchemical Corporation, New York, N. Y., a corporation of Ohio Application November 2, 1951, Serial No. 254,488

2 Claims. (Cl. 88—14)

This invention pertains to a new method and device for comparing or measuring radiant energy, being especially useful in the art of spectrophotometry and colorimetry.

In general, most methods of measuring the amount of light reflected by a surface compare the light reflected by the surface with the light reflected by a standard surface of known reflectance. This comparison is usually made by allowing the reflected beams to fall alternately on a photosensitive device. The substitution of one beam for the other is effected, e. g. by rotating a glass disk containing sectors that are alternately clear or silvered, or by vibrating a reed, having a vane attached thereto, in the path of the two beams. If, then, the light falling on the standard surface is reduced until, despite the alternation of the beams, no variation occurs in the response of the photosensitive device, the amount of the reduction is a measure of the reflectance of the surface under test. Such prior devices have the disadvantage of being unstable and inconsistent in performance because they are dependent upon (a), stability of the light source and (b), stability in the electrical response characteristics of phototubes and amplifiers. In addition, since the measure of reflectance in such prior devices is the degree of intensity adjustment required of one of two incident beams until the total light reflected becomes constant, speed of measurement is relatively low.

The present disclosure refers to a device responding at high speed, which is characterized by employing a light modulator together with an optical feedback arrangement which instantaneously balances the difference in the intensity of reflectance between a sample and the standard. Instead of using the degree of intensity adjustment as a measure of the reflectance of the sample, according to this invention the input power to the light modulator which is directly controlled by the reflectance ratio between the standard and sample is used as a measure of the reflectance of the sample.

It is one of the principal advantages of the herein disclosed device that, in contrast to prior apparatus of this type, the effects of variations in the light source and of instability in the response characteristics of the phototube and amplifier are completely eliminated. A further advantage is the extreme ruggedness of the device, having no delicate part at all, and the simplicity of the construction. These and other advantages will be apparent from the subsequent description.

The operation of the device is based on the so-called "photoelastic effect," namely the ability of transparent solids, such as carefully annealed glass or plastics which are isotropic in an unstressed condition, to rotate the plane of polarization when polarized light is passed through them while they are subjected to strain. I have discovered that, when a photoelastic element is inserted in a beam of light which is then divided into two beams adapted to alternately illuminate a sample and a standard at a given frequency, by employing an optico-electrical feedback arrangement, stresses can be applied to the photoelastic element at the same frequency, and that, with a properly selected photoelastic element, such stresses produce a linear modulation effect upon the light beam within the operative range of the device.

Figure 1:
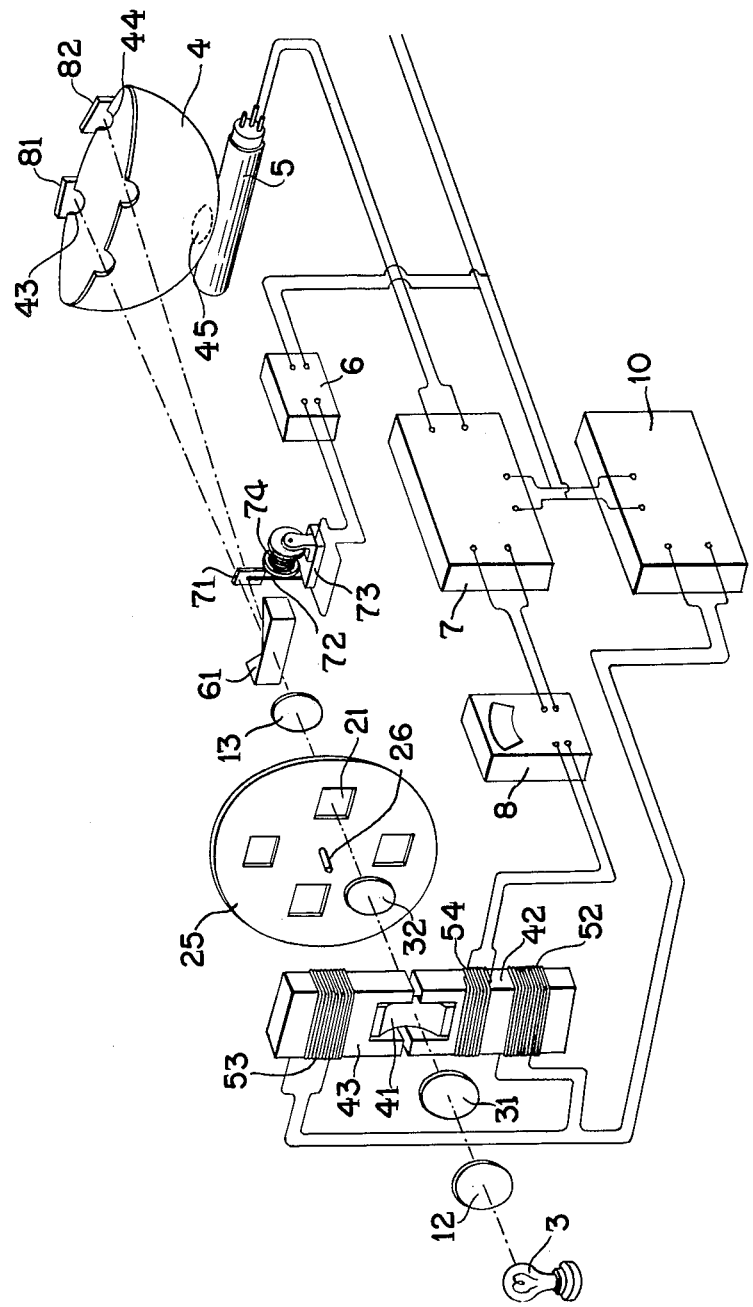
Fig. 1 is a perspective view of one embodiment of the device.

Referring in detail to the accompanying drawings, Fig. 1 shows a source of continuous light 3 directing a beam toward an optical arrangement which comprises the lenses 12 and 13 to focus the beam onto the rear wall of an integrating sphere 4. One means of producing illumination of the required single or narrow band wavelength is to suitably mount a monochromator prism in the path of the beam. I find it more practical to use so-called "interference filters," such as the filter 21, which transmit extremely narrow wavelength bands. Such an interference filter consists of a glass plate having a composite coating of, say, a conductor and a dielectric material, the film thickness of which are carefully controlled. To obtain transmittance of a given, narrow wavelength band of radiation, the film thicknesses are made an integral number of the half-wavelength of the desired radiation. While light of this particular wavelength is transmitted, the filter does not transmit radiation in the visible region of the spectrum that differs in wavelength substantially from the desired monochromatic light.

In order to readily avail myself of a number of interference filters transmitting narrow wavelength bands of radiation at different regions of the spectrum, I find it practical to mount a plurality of such interference filters in suitable apertures of a vertical disk 25 which can be turned about the shaft 26.

Inserted in the path of light passing from the lens 12 are the two disks 31 and 32 which consist of sheets of polarizing material and serve as polarizer, and analyzer, respectively, of the light beam from the source 3. They are mounted in such a manner with respect to each other that the disk 32 normally would cause extinction of the beam of polarized light passing from the disk 31. It is obvious that the same effect can be produced by means of two Nicol prisms in lieu of these disks.

Figure 2:
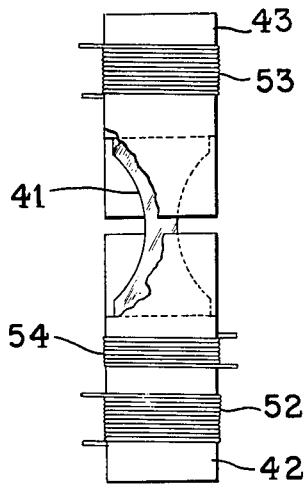
Fig. 2 is an enlarged side elevation of part of the device.

Positioned between the disks is a photoelastic modulator consisting of the photoelastic element 41 which is centered in the path of light passing from the disk 31 and is held between and within the recesses of two electromagnets 42 and 43, as shown. Fig. 2 indicates the shape of the photoelastic element which is selected so as to have the maximum stress in the center of the path of the light beam and to provide the desired mechanical stability. Fig. 2 also shows more clearly that the photoelastic element is supported by the electromagnet 42 and that the electromagnet 43 in turn straddles the photoelastic element. Since the two electromagnets do not meet, even if they are not excited there is a pressure exerted upon the photoelastic element, equal to the weight of the electromagnet 43. This pressure is in addition to, and part of, the normal operating pressure which is produced in the present embodiment by sending a current of uniform magnitude from the D. C. field exciter 10 through the coils 52 and 53 of the said electromagnets. It will be apparent from the foregoing, that a normal operation pressure exerted upon the isotropic, photoelastic body 41, which is to produce a given birefringence, say equal to turning one of the polarizing disks from a position of total extinction to a position of one-half extinction of the light beam, can be produced in other ways, for example by employing a sufficiently heavy electromagnet 43. Or the photoelastic element can be compressed by means of a spring or springs acting upon the electromagnets. The advantage of the here illustrated embodiment however is the avoidance of a steady substantial stress which may eventually cause changes in the photoelastic body and/or in the spring or springs due to fatigue and resulting in erroneous readings.

One of the electromagnets, in the present embodiment the electromagnet 42, is in addition provided with a modulating coil 54, for the purpose of producing, in response to signal impuses from the integrating sphere 4, increases (or decreases) in the normal operation stress exerted upon the photoelastic element 41.

In order to obtain such signal impulses, there is placed in the path of light passing from the lens 13 a biprism 61 which splits the beam into two beams, directed toward the integrating sphere as shown. Centered intermediate the two beams so as to partly obstruct the path of each beam is the vane 71, mounted on the vibrating reed 72, consisting of, say, a thin blade of spring steel. The reed is fastened to a relatively large mass 73 and is oscillated by means of a low voltage alternating current, having, most practically, a frequency of 60 cycles per second, furnished by the transformer 6 to the coil of the electromagnet 74, situated in such proximity to the reed that the latter vibrates at maximum efficiency if alternately attracted and repelled by the iron core of the electromagnet.

Figure 3:
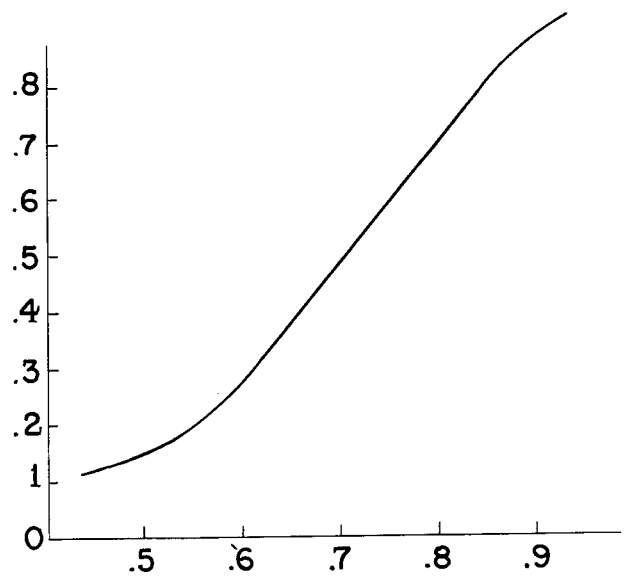
Fig. 3 is a graph explaining in part the operation of the device.

For the testing of a light-reflecting substance, for instance, a standard 81 and a sample 82 are inserted in ports 43 and 44, respectively, provided at the rear wall of the integrating sphere 4, which has a phototube 5 adjacent to the port 45 thereof. Upon vibration of the reed a sinusoidal signal is generated in the phototube if a sample and a standard which differ in reflectance are placed in the respective ports of the integrating sphere. This signal, after passing through a voltage and power amplifier 7 (with phase control network), is fed to the oscillating coil 54 of the electromagnet 42, causing an instantaneous increase in the stress exerted upon the photoelastic element 41 and, due to the resulting increased intensity of the beam, a balancing effect upon the combined light reflected from the sample and the standard. As shown in the graph Fig. 3, which coordinates light output (ordinate) with input current (abscissa), the light output of the photoelastic modulator is over a wide range in linear response to the current input at the oscillating coil 54 and the instrument can be readily set up so that readings taken at the voltmeter 8 provide a direct measure of reflectance differences.

Since, according to this particular embodiment, the port 44 of the integrating sphere is intended for insertion of the sample, I find it most practical to adjust the signal phase in such a manner that an impulse passes to the oscillating coil 54 if light reflected from the sample is of lower intensity than light reflected from the standard in port 44. Ordinarily, in tests of this kind, the standard will exceed the sample in reflectance. If, in some instances, the reflectance of the sample should be higher than that of the standard, a signal will result only after they have been reversed in position at the integrating sphere.

A device of this disclosure comprising the photoelastic element operated by means of feedback signals in the foregoing manner is useful in connection with other optical instruments, such as a colorimeter or densitometer into which the aforedescribed instrument is readily converted by changing the spectral distribution of light passing the reed.

I claim:

1. In a photometric apparatus comprising an integrating sphere having a first and second port for the insertion of samples, a phototube adjacent to another port in the integrating sphere, means for generating a light beam, inserted in the said light beam a polarizer and an analyzer set to extinguish the polarized light, a biprism dividing the said light beam into two beams directed at the said sample ports in the integrating sphere, means for amplifying signals generated by the said phototube, a reed adapted to vibrate by electrical impulses, a vane mounted on the reed obstructing equal portions of the said beams when at rest and equal alternate portions when vibrating, the improvement comprising a light modulator inserted in the path of light between the said polarizer and analyzer, the said light modulator consisting of a photoelastic body arranged between two electromagnets which are actuated by a current of uniform voltage to exert a stress upon the photoelastic body which is about equal in effect to turning the analyzer from total extinction of the light to one-half extinction, and a modulating coil wound about at least one of the electromagnets so as to increase the stress upon the photoelastic body in accord with amplified signals generated by the phototube due to the intensity of the light received by the phototube from one sample being lower than the intensity of the light received from the other sample, and means for feeding such amplified signals to the said modulating coil.

2. A photometric apparatus according to claim 1, which comprises a biconcave photoelastic body developing maximum stress in that part of the said body which has the smallest cross-sectional area and is centered in the light beam.

References Cited in the file of this patent
UNITED STATES PATENTS

| | | |
|---|---|---|
| 1,894,132 | Stone | Jan. 10, 1933 |
| 1,919,182 | Fitz-Gerald | July 18, 1933 |
| 1,921,852 | Whitaker | Aug. 8, 1933 |
| 2,126,410 | Pineo | Aug. 9, 1938 |
| 2,151,474 | Johnson | Mar. 21, 1939 |
| 2,206,576 | Pineo | July 2, 1940 |
| 2,438,422 | Stearns et al. | Mar. 23, 1948 |
| 2,439,373 | Stearns | Apr. 6, 1948 |
| 2,562,910 | Hardy | Aug. 7, 1951 |